United States Patent [19]
Bennett

[11] 4,038,847
[45] Aug. 2, 1977

[54] MOTORCYCLE LOCK

[75] Inventor: Bruce A. Bennett, Larkspur, Calif.

[73] Assignee: Creative Innovations, Corte Madera, Calif.

[21] Appl. No.: 640,718

[22] Filed: Dec. 15, 1975

Related U.S. Application Data

[63] Continuation-in-part of Ser. No. 568,977, April 17, 1975.

[51] Int. Cl.² ............................................. B60H 5/00
[52] U.S. Cl. ...................................... 70/233; 70/228
[58] Field of Search ............... 70/233, 236, 226, 228, 70/193, 194; 188/265

[56] References Cited

U.S. PATENT DOCUMENTS

| | | | |
|---|---|---|---|
| 391,247 | 10/1888 | Gongware et al. | 70/228 |
| 508,490 | 11/1893 | Snyder | 188/265 |
| 2,497,293 | 2/1950 | Cade | 188/265 |

FOREIGN PATENT DOCUMENTS

| | | | |
|---|---|---|---|
| 851,244 | 1/1940 | France | 70/194 |
| 130,253 | 11/1900 | Germany | 70/228 |
| 22,456 | 2/1930 | Netherlands | 188/269 |
| 375,602 | 6/1932 | United Kingdom | 188/265 |

*Primary Examiner*—Robert A. Hafer
*Attorney, Agent, or Firm*—Gordon Wood

[57] ABSTRACT

A lock of rugged construction for preventing theft of a motorcycle. When the cycle is parked the brake is applied and a holding device is employed to hold the brake mechanism in locked position. In one form of the invention a traveling nut is employed for so holding the brake mechanism. Access to the device is prevented by means of a key actuated removable lock. In another form of the invention a wedge is employed in the holding device and a removable key actuated lock is connected to said wedge.

4 Claims, 4 Drawing Figures

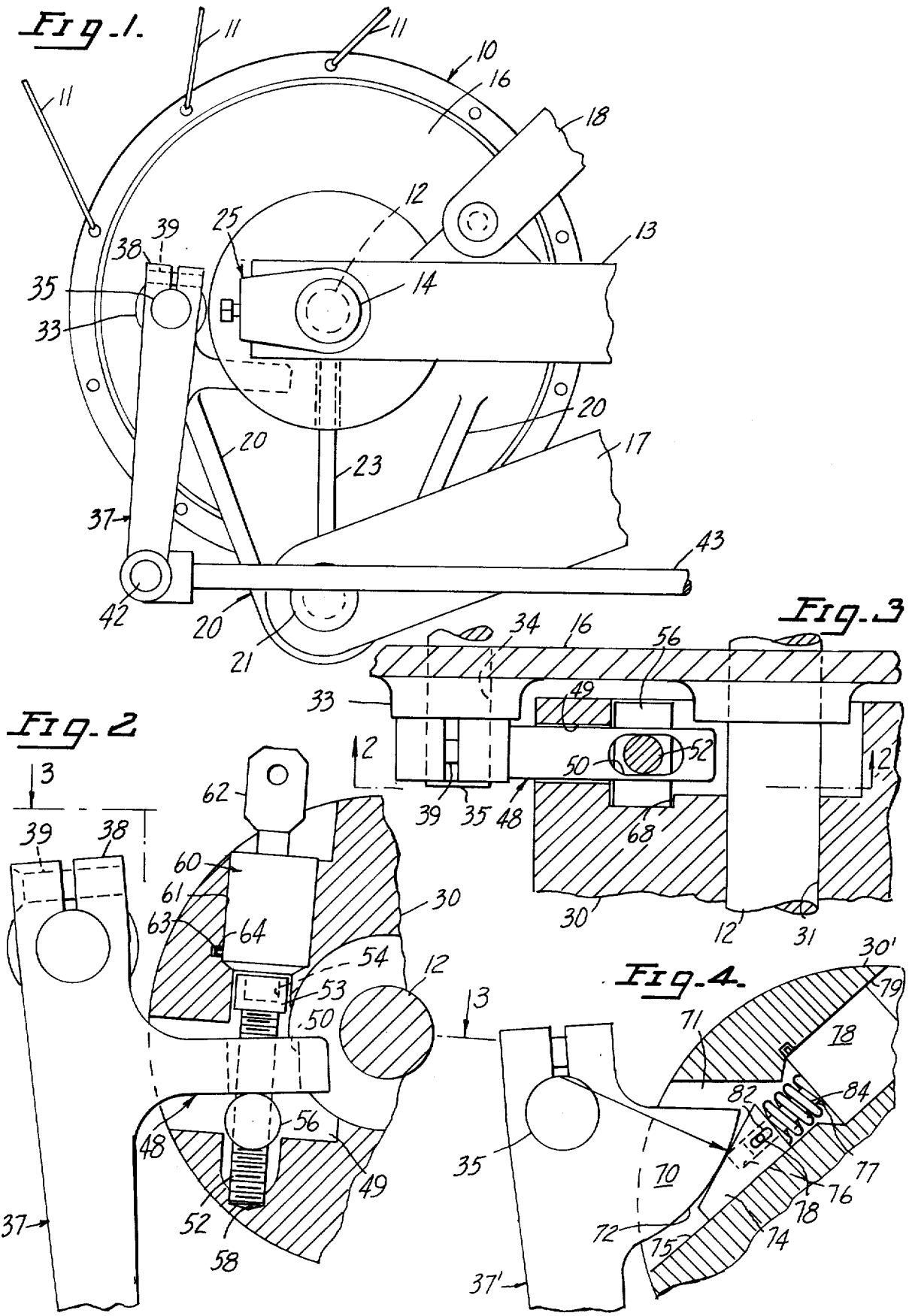

MOTORCYCLE LOCK

This application is a continuation-in-part of application Ser. No. 568,977, filed Apr. 17, 1975.

This invention relates to a lock for motocycles to prevent the cycle from being driven or pushed away except by an authorized person.

The main object of the present invention is the provision of an extremely rugged locking device for locking the rear brake of a motorcycle in locked position when the motorcycle is parked.

Another object of the invention is the provision of an extremely safe locking device which cannot be actuated accidentally while the motorcycle is in motion.

Other objects and advantages will be apparent from the following specification and from the drawings.

FIG. 1 is a fragmentary side elevation of the hub portion of a conventional motorcycle showing the present invention.

FIG. 2 is a fragmentary view of the invention taken in a plane indicated by lines 2—2 of FIG. 3.

FIG. 3 is a part plan view and part horizontal sectional view taken in planes indicated by lines 3—3 of FIG. 2.

FIG. 4 is a view similar to FIG. 2 showing a modified form of the invention.

In detail and first with reference to FIG. 1, the invention is adapted to be employed with a conventional motorcycle having a rear wheel hub 10 which is connected by outwardly extending spokes to the outer wheel portion (not shown) of the wheel. Some of said spokes are indicated at 11 in FIG. 1. The rear wheel is rotatably supported on an axle 12 which extends outwardly through a frame member 13 and is provided at its outer end with a nut 14. The axle 12 also passes through a brake mounting plate 16 which is fixedly secured relative to the body of the cycle by lower frame member 17. An upper frame member 18 secured to the frame 13 is usually also provided.

The brake supporting plate 16 is formed with a downwardly extending extension 20 to which the lower frame member 17 is pivotally secured as at 21. To strengthen the extension 20 a pair of converging outer reinforcing ridges 22 are provided and also a central vertically extending ridge 23.

The chain driven sprocket wheel is on the opposite side of the cycle and is not shown in the drawings. However, in order to make a symmetrical arrangement on both sides of the cycle, a spacer is usually interposed between the frame member 13 and the brake support plate 16. This spacer is normally quite large and may be several inches in thickness. By the present invention the conventional spacer is replaced by a substantially solid housing generally designated 30. This housing is provided with a central bore 31 (FIG. 3) through which the axle 12 extends.

A chain tensioning device generally designated 25 is also mounted on frame 13 and as will subsequently be seen such chain tensioning device cooperates to prevent unauthorized removal of the housing 30.

Rearwardly of the rear axle 12 the brake support plate 16 is provided with an outwardly projecting boss 33 which is formed with a central bore 34 for rotatably receiving therein a brake actuating shaft 35. A generally downwardly extending brake actuating lever 37 is fixedly secured at its upper end to shaft 35 by means of a clevis 38 adapted to be tightened by a security bolt 39 which cannot be removed.

The lower end of lever 37 is swingably connected by pivot 42 to a forwardly extending rod 43 which is connected at its right hand end to the brake pedal (not shown). At this point it will be understood that according to conventional design when the brake pedal is pressed downwardly the rod 43 moves to the right thereby swinging the lever 37 in a counter clockwise direction to actuate the usual camming members which in turn move the brake shoes radially outwardly to engage the brake. None of the brake structures is shown in the drawings as it is conventional.

Integral with the lever 37 is an outwardly extending arm 48 which is received with a cavity 49 in the housing 30. As best seen in FIG. 3 the arm 48 is formed with an elongated slot 50 for receiving therethrough a bolt 52 having a head 53 provided with a socket 54 for receiving a wrench. The bolt 52 passes through an elongated cylindrical nut 56 and is threadedly secured thereto. The end of bolt 52 is received in a complementarily formed socket 58 formed in housing 30.

From FIG. 2 it will be apparent that when bolt 52 is turned in one direction the nut 56 will be urged against the underside of arm 48 tending to move it in a brake tightening direction. In FIG. 1 the arm 37 is shown in the brake released position and in FIG. 2 the arm 37 has been swung some ten degrees to the brake tightening position. Thus it will be apparent that the structure of FIG. 2 holds the brake in its actuated condition.

In order to prevent removal of bolt 52 except by an authorized person a cylindrical key actuated lock generally designated 60 is received within a bore 61 which is coaxial with bolt 52. The key 62 is adapted to actuate a latch 63 received within a slot 64 formed in housing 30. By the above described structure the bolt 52 may be actuated by an authorized person to hold the lever 37 in the brake engaging position and thereafter the lock 60 may be inserted so as to block access to the bolt 52. Thus when the key 62 is removed the braking structure cannot be tampered with in any way.

As best seen in FIG. 3 the nut 56 is slidably received within a slot 68 in housing 30 so as to prevent rotation of said nut.

A modified form of the invention is shown in FIG. 4 wherein the brake actuating arm 37' is provided with an integral cam 70 received in a cavity 71 formed in housing 30'. The working surface 72 of cam 70 is in engagement with a wedge 74 which in turn is slidably supported on a flat surface 75 formed in housing 30'. The wedge 74 is formed with a bore 76 in which is slidably received one end of an elongated pin 77 secured to key actuated lock 78 received in bore 79. Adjacent the outer end of rod 77 the same is provided with a transversely extending pin 78 which is received within a pair of elongated slots 82 formed in the opposite sides of wedge 74. The wedge 74 is yieldably urged into frictional engagement with cam 70 by a compression spring 84 interposed between said wedge 74 and the key actuated lock 78. From FIG. 4 it will be noted that when the key actuated lock 78 is in its locked position movement of arm 37' in a clockwise or brake releasing direction is prevented. This result is insured by forming the outer face 72 of cam 70 to a radius which has a center above the center of shaft 35 as indicated in FIG. 4.

In the FIG. 4 structure, removal of the lock 78 also removes the wedge 74 so that no accidental engagement with cam 72 is possible while the motorcycle is moving.

Preferably one leg of the chain tensioning device 25 is recessed into the housing 30 so that removal of the same is prevented without removal of the axle 14. This structure contributes to preventing rotation of the housing 30 or rotation of the brake mounting plate 16.

I claim:

1. In combination with a cycle having a rear axle and a frame member connected to said axle, a brake plate fixed relative to said axle, and a brake actuating lever swingably mounted on said plate, a lock for said cycle comprising:
   a housing interposed on said axle between said frame member and said brake plate,
   an extension integral with said lever and formed with a smooth abutment surface,
   said housing being fixed relative to said brake plate and formed with a cavity for receiving said extension therein,
   holding means in said housing engageable with said abutment surface for holding said lever in brake actuating position, and
   a key actuated lock in said housing obstructing access to said holding means.

2. A lock according to claim 1 wherein said holding means includes a threaded element in said cavity and adapted to be rotated from outside said housing.

3. A lock according to claim 1 wherein said holding means includes a wedge in frictional engagement with said abutment surface, and spring means urging said wedge against said surface.

4. In combination with a cycle having a rear axle, a brake mounting plate fixed relative to said axle, and a brake actuating lever swingably mounted on said plate, a lock for said cycle comprising:
   an extension integral with said lever,
   a housing fixed relative to said plate and provided with a cavity for receiving said extension therein,
   holding means in said housing for preventing movement of said lever from brake actuating position,
   said holding means including a threaded element in said cavity and adapted to be rotated from outside said housing, and
   a key actuted lock for blocking access to said threaded element.

* * * * *